March 10, 1970 R. H. CULLEN ET AL 3,499,668
PIPE
Filed March 11, 1968 2 Sheets-Sheet 1
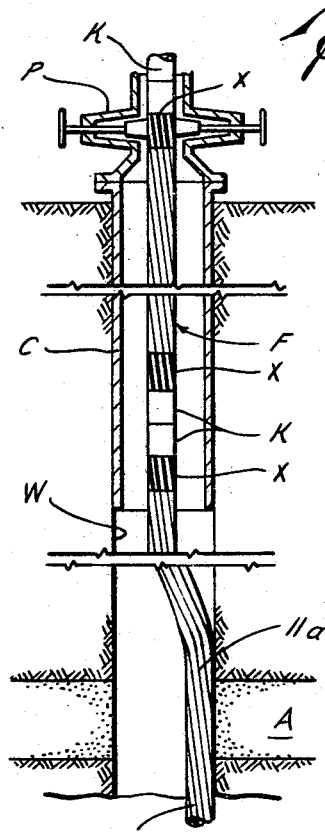
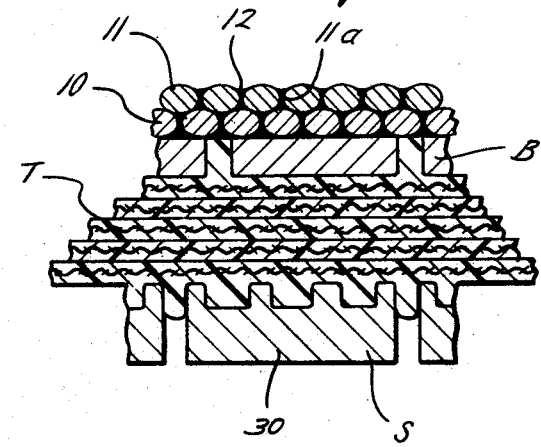
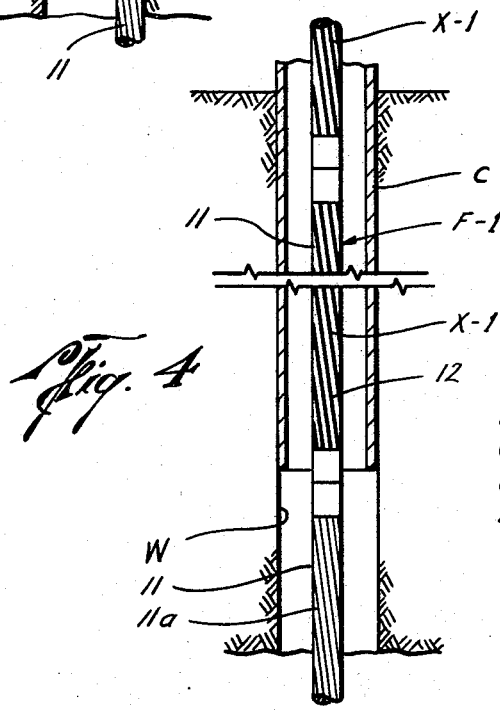
Roy H. Cullen
Charles H. Elliott
Jimmie R. Aker
Harvey O. Mohr
INVENTORS
BY
ATTORNEYS March 10, 1970  R. H. CULLEN ET AL  3,499,668
PIPE
Filed March 11, 1968  2 Sheets-Sheet 2
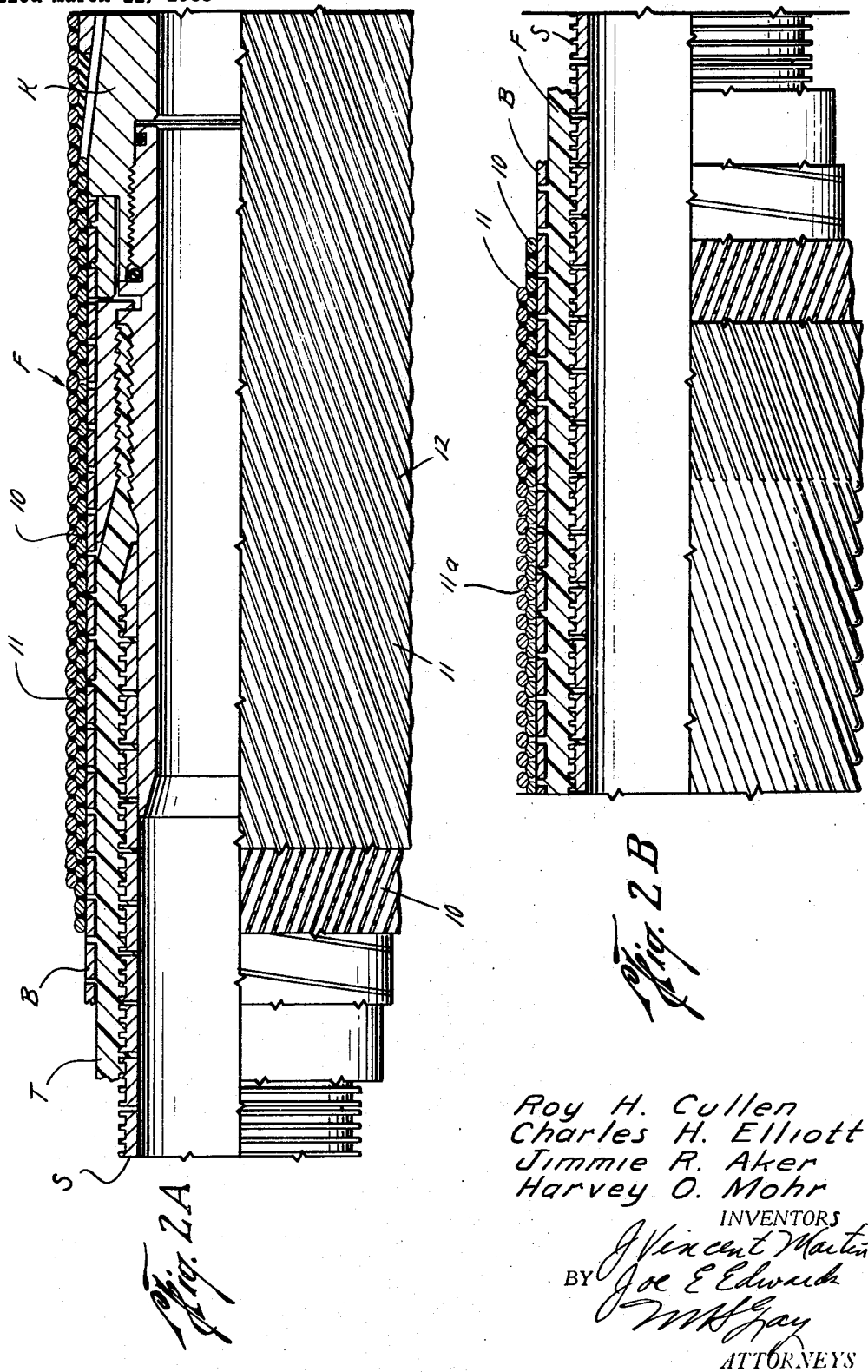
Roy H. Cullen
Charles H. Elliott
Jimmie R. Aker
Harvey O. Mohr
INVENTORS
BY
ATTORNEYS

# United States Patent Office 3,499,668
Patented Mar. 10, 1970

3,499,668
PIPE
Roy H. Cullen, Charles H. Elliott, Jimmie R. Aker, and Harvey O. Mohr, Houston, Tex., assignors to The Youngstown Sheet and Tube Company, Youngstown, Ohio, a corporation of Ohio
Continuation-in-part of application Ser. No. 648,039, June 22, 1967. This application Mar. 11, 1968, Ser. No. 712,163
Int. Cl. F16l 39/00
U.S. Cl. 285—149                                9 Claims

ABSTRACT OF THE DISCLOSURE

Flexible pipe for drilling and other well operations wherein the pipe has an external surface formed of helically disposed wires wherein the pipe has one or more portions or sections with the interstices at least partially filled with an elastomer or the like for sealing engagement by a blowout preventer and wherein the wires bear against an internal spring or other support to provide crush resistance for permitting retractor grippers and blowout preventer rams to be applied to the flexible pipe with high forces. Also, the unfilled or partially filled interstices between the outer wires provide helical grooves to prevent or inhibit the sticking of the flexible pipe to the wall of a well bore.

CROSS REFERENCE TO RELATED APPLICATION

This application is a continuation-in-part of United States patent application Ser. No. 648,039 filed June 22, 1967.

BACKGROUND OF THE INVENTION

The field of this invention is flexible pipe for drilling and other operations in wells.

It is well known that drill collars and pipe are subjected to a fluid force which presses the drill collars or pipe against the wall of a well bore when well bore fluids seep into a well formation. See for example the disclosure in U.S. Patent No. 2,999,552. In said patent application Ser. No. 648,039, as well as U.S. Patent Nos. 2,915,323; 3,004,779; and 3,276,794, flexible drill pipe or hose is disclosed which has helical interstices or grooves formed between adjacent helically wrapped external armor wires which function to equalize the well pressure on all of the external sides of the pipe or hose so as to inhibit or prevent sticking of the pipe against the wall of the well bore due to the fluid forces caused by the seeping of the well fluids into the formation.

SUMMARY OF THE INVENTION

With the present invention, the flexible pipe includes a short portion adjacent each section coupling which has external wires with interstices therebetween at least partially filled with an elastomer, flexible resin, or other flexible material to provide an external surface portion for engagement by a blowout preventer so as to provide a seal around the external surface of the flexible pipe while at the same time providing an internal support in the form of a spring or crush-resistant structure to permit blowout preventer arms and retractor grippers to be applied to the wires with high forces, such as by the grippers of Patent No. 2,892,535.

Alternatively, the interstices between the external wires on a complete pipe section or sections are at least partially filled, and such sections are then used near the surface in the cased portion of the well while sections having unfilled armor wire are used therebelow where wall sticking might otherwise occur.

The unfilled interstices between the external helically wrapped wires provide helical grooves to equalize pressure on all sides of the flexible pipe adjacent a well formation so as to prevent wall-sticking thereof.

Thus, the present invention combines the advantages of preventing or inhibiting wall-sticking of the flexible pipe while retaining control of the fluid flow around the pipe with blowout preventers and the strength for blowout preventer rams and retractor grippers to be applied with high force.

BRIEF DESCRIPTION OF THE DRAWINGS

FIGURE 1 is an elevation wherein a plurality of sections of the flexible pipe of this invention are connected together to form a string of pipe in a well bore;

FIGURES 2A and 2B are views, partly in section and partly in elevation, illustrating in detail one flexible pipe construction employing the invention illustrated in the form of the flexible pipe shown in FIGURE 1;

FIGURE 3 is an enlarged fragmentary sectional view through the pipe; and

FIGURE 4 is an elevation illustrating another form of the present invention.

DESCRIPTION OF THE PREFERRED EMBODIMENTS

In the drawings, the letter F designates generally the flexible pipe of this invention (FIGURE 1) which is adapted to be disposed in a well bore W which normally will have an upper portion thereof which is cased by a casing C. The casing C has a blowout preventer P as well as other wellhead equipment (not shown) and through which the flexible pipe F is lowered in the known manner. The flexible pipe F is lowered into the casing C and the well bore W which is uncased so that during drilling and other well operations the flexible pipe F extends through a well formation such as indicated at A. The seeping of well fluid or mud into the formation A causes a differential in pressure between the mud or drilling fluid pressure in the well bore W and the fluid pressure in the formation A which results in a tendency of the flexible pipe F to move into contact with the wall of the well bore as indicated by the position of the flexible pipe F adjacent the formation A in FIGURE 1. If the pressure were not equalized on all sides of the flexible pipe F at such area, there would be a sticking of the flexible pipe F to the wall of the well bore W and such sticking force would be severe enough to sometimes prevent the movement of the flexible pipe F longitudinally in the well bore W. However, as will be explained more in detail with the present invention, the flexible pipe F is formed with an outer surface of flexible wires which have helical interstices between adjacent wires for the relieving of the pressure at the portion of the flexible pipe F adjacent the well formation A so as to equalize the pressure on all sides of the flexible pipe F and thereby prevent wall sticking of the pipe F. At the same time, the present invention provides a portion of the flexible pipe F indicated at X which has the interstices between the wires at least partially filled with a flexible material so that the blowout preventer P may be engaged therewith for closing off the annulus around the flexible pipe F in the event it is necessary or desirable to control the well fluid with the blowout preventer P. In the embodiment illustrated in FIGURE 1, the flexible pipe F has a section X which is short compared to the rest of the flexible pipe F and which is preferably located adjacent an end coupling K for each section of the flexible pipe F as will be more evident hereinafter.

Although the specific construction of the flexible pipe F may be varied and may take forms such as illustrated in U.S. Patent Nos. 2,915,323; 3,004,779; and 3,276,794 as well as United States patent application Ser. No. 648,-039, one form of the flexible pipe F has been illustrated in FIGURES 2A and 2B by way of example only. Thus, the flexible pipe F, as illustrated in FIGURES 2A, 2B and 3, includes a tubular fluid conductor T, burst-strength and crush-resistant means B, and collapse-strength means S.

A plurality of layers of armor wires 10 and 11 is secured externally of the burst-strength means or layer B, preferably in the manner heretofore described in U.S. Patent No. 3,276,794. Such armor wires 10 and 11 are helically wrapped in opposite directions to each other, and the ends thereof are suitably clamped to the coupling K by any suitable means such as that illustrated in said Patent No. 3,276,794. The layer T may be formed in numerous ways, and as illustrated in FIGURE 3, it may be formed with a plurality of fabric layers embedded in an elastomer such as neoprene. The tubular conduit T is disposed between a helically wound spring which forms the burst-strength layer B and a plurality of rings 30 or other suitable means forming the collapse-strength means S (FIGURE 3).

For the major portion or length of the flexible pipe F between the end couplings K, the interstices 11a between adjacent wires forming the layer of wires 1 are unfilled so that such interstices 11a provide helical grooves which are able to permit the flow of fluid therein. Thus, such interstices 11a which are in a position adjacent a formation A (FIGURE 1) serve to communicate the surface or side of the flexible pipe F which is forced against the wall of the well bore W with the area in the well bore W which is above and below and inwardly of the flexible pipe F. Such communication equalizes the fluid pressure on all sides or completely around the flexible pipe F in the vicinity of the formation A in the well bore W to thereby prevent a sticking force which might otherwise prevent the longitudinal movement of the flexible pipe F in the well bore W. Thus, although the flexible pipe F might move to the position adjacent the formation A illustrated in FIGURE 1 by reason of the seeping of the fluid from the well bore W into the formation A, or by reason of a higher mud pressure in the well bore W than in a well formation, the flexible pipe F would not stick or adhere to the wall of the well bore W due to the equalization provided by the helical interstices between adjacent external wires 11 on the flexible pipe F. In many instances, the presence of the helical interstices or grooves 11a between adjacent wires in the layer 11 may even prevent the urging of the flexible pipe F into engagement with the wall of the well bore W adjacent the formation A, but in either event wall-sticking is prevented or inhibited with the present structure.

The exposed wires 11 provide a good surface for the grippers of a retractor unit to engage. By providing the spring B or other back-up member in contact with the wires 10 as shown, the metal wires 10 bear directly against the metal spring B so that the pipe F can withstand considerable force applied by blowout preventer rams and by retractor grippers such as those disclosed in Patent No. 2,892,535, which bear directly against the external surface of the wires 11.

Elastomer 12 is provided in the interstices 11a between the wires 11 and it should extend outwardly to at least approximately the center lines of the outer wires 11 which center lines run longitudinally of the pipe F. As the faces of blowout preventer rams are covered with elastomers, sufficient distortion and cold flow of the elastomer on the rams and between the wires 11 occurs so that they contact each other to produce a seal between the two elastomers when the rams are closed about the pipe F. Although it is preferable for the elastomer 12 to extend outwardly further than the center line of the wires 11 as illustrated in the drawings so as to be substantially flush with the external surfaces of the wires 11, this is not essential; in fact, there are advantages in having the elastomer 12 only partially filling the interstices 11a.

For example, when the elastomer 12 extends out to only approximately the center line of wires 11, or some other distance less than that required to make the external surface of the elastomer 12 flush with the wires 11, a portion of the annular external grooves 11a remain between the wires 11 and externally of the elastomer 12 through which liquid can flow when the pipe F is against a well formation through which fluid is being lost. Thus wall-sticking is prevented or reduced even at each section X of the pipe F if the grooves 11a between the wires 11 are not completely filled with the elastomer 12. It should also be noted that although it is preferable to have the elastomer 12 extend between the wires 10 also as shown in FIGS. 2A, 2B and 3, this is not essential, so long as sufficient elastomer 12 is present to prevent fluid flow between the wires 11 and the blowout preventer rams and underneath or through the wires 10 and 11.

In the form of the invention illustrated in FIGURE 1 and in the specific version thereof illustrated in FIGURES 2A, 2B, and 3, the flexible pipe F is formed in sections with the coupling K at each end thereof and adjacent each of the couplings K a short section X is provided for engagement by a blowout preventer P in the event this becomes necessary. Such short section X is illustrated specifically in FIGURES 2A and 3, and as can be seen therein, the interstices 11a are at least partially filled with an elastomer 12 or any other suitable flexible material.

The elastomer 12 may be a synthetic rubber such as neoprene, or it may be a flexible epoxy resin or any other suitable flexible material which is disposed in the interstices 11a to provide an annular external surface for sealing engagement by the conventional blowout preventer such as indicated at P in FIGURE 1.

As illustrated in FIGURES 2A and 3, the elastomer 12 or other flexible material is also dispersed between the wires in the layer 10 and elsewhere adjacent the coupling K as shown for the length of each section X to prevent passage of fluid through, between, or underneath the wires 10 and 11 in the section X engaged by the blowout preventer P.

In the operation or use of the flexible pipe F illustrated in FIGURES 1-3, the sections X are preferably disposed adjacent the couplings K, but it will be appreciated that they may be located at other parts or areas of the flexible pipe F. Also, they need not be at both ends of each of the sections of the flexible pipe F but are preferably provided so that they may be readily engaged by the blowout preventer P in the event this becomes necessary to prevent a blowout or otherwise seal off the well fluid at the surface.

The unfilled interstices 11a which form a major portion of the flexible pipe F are sufficient to prevent wall-sticking of the flexible pipe F during drilling operations and other well operations wherein the flexible pipe F is disposed in the well bore W. The filled portions X of the flexible pipe F are short so that they are not sufficient in area to cause the pipe to stick even if they should be disposed in the vicinity of a well formation A which might be receiving well fluid or which might otherwise be at a lower pressure than the pressure of the mud or other fluid in the well bore W. The flexible pipe F may be partially sealed off at any point along its length by the blowout preventer and then the pipe F may be longitudinally moved upwardly or downwardly with the blowout preventer P closed until a section X thereof is engaged by the blowout preventer P to fully close off the annulus around the flexible pipe F.

Another modification of the present invention is illustrated in FIGURE 4 wherein the modified flexible pipe F-1 is shown as disposed in a well bore W having casing C therein in the same manner as described heretofore in connection with FIGURE 1. The blowout preventer P is likewise employed in the usual manner, but it is not illustrated in FIGURE 4. The modified form of the flexible pipe F-1 includes a plurality of upper sections of flexible pipe X-1, each of which has the same helical external wires 11 with helical interstices 11a between adjacent wires and in which the interstices 11a are all filled with a flexible material 12. Thus, one or more complete sections X-1 in the vicinity of the casing C are formed in the same manner as the short section or portion X described heretofore in connection with FIGURES 1-3. The remaining sections of the flexible pipe F-1 therebelow do not have the interstices 11a between the external wires 11 filled with elastomer, and therefore they are unfilled as described in connection with the flexible pipe F. The unfilled interstices 11a are thus disposed in the open well bore W and they provide for the equalization of the pressure around the entire annulus on all sides of the flexible pipe F-1 below the sections X-1. The sections X-1 may be engaged by the blowout preventer P when it is necessary or desirable to close off the annulus around the flexible pipe F-1, while at the same time the flexible pipe sections therebelow having their interstices 11a unfilled for the entire length of each section are disposed in the open well bore W and are capable of equalizing the fluid pressure as previously explained. It will be understood that although only two sections X-1 have been illustrated in FIGURE 4, the number of such sections X-1 may be varied so as to provide one or more of such sections X-1 near the upper end of the drill string forming the flexible pipe F-1.

The operation or use of the form of the present invention illustrated in FIGURE 4 is substantially the same as that described heretofore in connection with FIGURE 1, except that equalization of pressure for the full length of each pipe section is provided with respect to the sections of the flexible pipe F-1 below the pipe section or sections X-1. Thus, the full length of the interstices or grooves 11a on all the flexible pipe sections below the lowermost sections X-1 are capable of equalizing the pressure around such sections to prevent the sticking thereof against the wall of the well bore W. Since the section or sections X-1 are disposed at the upper end of the string in the vicinity of the blowout preventer P, the blowout preventer P may be readily engaged with the annular external surface provided by the filled interstices and the wires forming the layer 11 of the sections X-1 adjacent the blowout preventer P to thereby provide the seal in the annulus when desired or necessary.

It will be appreciated that combinations of the two forms of the invention illustrated in FIGURES 1 and 4 may be utilized, and other variations thereof may also be employed within the skill of the art.

It will be appreciated that the wires 10 and 11 are shown to have spaces identified as at 11a which are larger than will usually be present in practice as the wires are wound tight and touch.

From the above it will be seen that there has been provided a structure against which a blowout preventer will seal due to the elastomer. The elastomer however is positioned so that it does not transmit the clamping forces exerted on the pipe. The wires 11 engage the wires 10 which in turn engage the burst-strength layer B which supports the wires. Thus the elastomer has no effect on the collapse resistance of the structure when clamped by a retractor or a blowout preventer.

The foregoing disclosure and description of the invention are illustrative and explanatory thereof, and various changes in the size, shape and materials, as well as in the details of the illustrated construction may be made within the scope of the invention.

What is claimed is:

1. Flexible pipe adapted to be used in a well bore, comprising:
    a flexible tubular fluid conductor having a coupling at each end thereof;
    means with said conductor and providing crush resistance for the pipe to permit the pipe to be clamped with high force;
    an outer layer of helically disposed wires surrounding said means and conductor and held in placed thereabout, said layer having helical interstices between wires for equalizing pressure on all sides of the flexible pipe; and
    at least a minor portion of the length of said flexible pipe having the interstices between said wires at least partially filled with a flexible material extending outwardly to at least approximately the center line of said wires whereby said flexible material and wires are adapted to engage blowout preventer rams when the rams are closed about the pipe to close off the annulus between the pipe and the well bore.
2. The structure set forth in claim 1, wherein:
    said length of said interstices which have the flexible material being in proximity to at least one of said couplings and being short in length as compared to the length of the other unfilled interstices between said couplings.
3. The structure set forth in claim 1, wherein:
    said length of said interstices which have the flexible material being in proximity to both of said couplings and being short in length as compared to the length of the other unfilled interstices between said couplings.
4. The structure set forth in claim 1, wherein:
    said flexible pipe is formed in a plurality of sections;
    said couplings connecting said sections together; and
    said length of interstices which have the flexible material extending the full length of at least one of said sections.
5. The structure set forth in claim 1, wherein:
    said flexible material is an elastomer.
6. The structure set forth in claim 1, including:
    an inner layer of helically disposed wires wrapped in an opposite helical direction to said outer layer of wires; and
    flexible material filling spaces between the wires in said inner layer.
7. The structure set forth in claim 6 wherein said wire layers bear against each other and against the crush resistance means whereby said flexible material is not disposed between the points of contact between the crush resistance means and the wire layers and a clamping structure surrounding the pipe.
8. The structure set forth in claim 1 wherein said means with the conductor surrounds the conductor.
9. The pipe of claim 8 wherein:
    the means providing crush resistance is a spring.

References Cited
UNITED STATES PATENTS

| | | | |
|---|---|---|---|
| 219,596 | 9/1879 | Perry | 138—127 |
| 779,374 | 1/1906 | Phillips | 138—131 |
| 1,310,715 | 7/1919 | Rose et al. | 138—132 |
| 3,093,162 | 6/1963 | Reiling | 138—129 |

FOREIGN PATENTS 748,045  10/1944  Germany.

THOMAS F. CALLAGHAN, Primary Examiner

U.S. Cl. X.R.
138—127, 131, 134